Patented July 7, 1953

2,644,814

UNITED STATES PATENT OFFICE 2,644,814

WATER-INSOLUBLE MONOAZODYESTUFFS

Ernst Fischer, Offenbach am Main, Germany, assignor to Farbwerke Hoechst A. G. vormals Meister Lucius und Brüning, Frankfurt, Germany No Drawing. Application January 9, 1951, Serial No. 205,218. In Germany January 20, 1950

6 Claims. (Cl. 260—193)

This invention relates to new water-insoluble monaozo-dyestuffs and more particularly to compounds of the following general formula

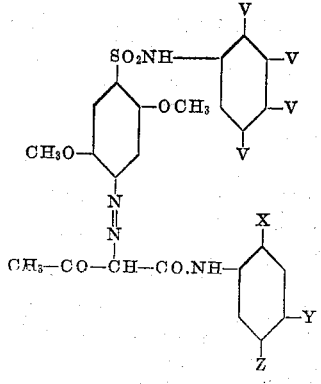

wherein each V stands for a substituent of the group consisting of hydrogen, lower alkyl, lower alkoxy and halogen, and X stands for a substituent of the group consisting of lower alkyl and lower alkoxy, and Y stands for a substituent of the group consisting of lower alkoxy and halogen, and Z stands for a substituent of the group consisting of lower alkyl, lower alkoxy and halogen, at least one of the substituents X, Y and Z standing for lower alkoxy and one of the substituents Y and Z standing for halogen, being water-insoluble yellow powders and producing yellow tints having good properties of fastness, being especially suitable for coloring plastic masses composed of organic compounds of high molecular weight, for producing colored lacquers fast to oil and light and for producing spun-dyed artificial silk.

According to this invention pigment dyestuffs are made by coupling a diazo compound of an amine of the general formula

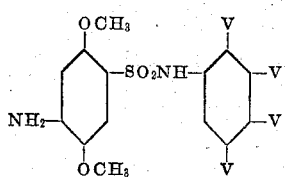

in which V stands for a substituent of the group consisting of hydrogen, lower alkyl, lower alkoxy and halogen, with an acetoacetic acid arylide of the general formula

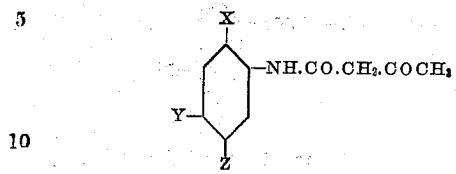

wherein X stands for a substituent of the group consisting of lower alkyl and lower alkoxy, and Y stands for a substituent of the group consisting of lower alkoxy and halogen, and Z stands for a substituent of the group consisting of lower alkyl, lower alkoxy and halogen, at least one of the substituents X, Y and Z standing for lower alkoxy and one of the substituents Y and Z standing for halogen. Preferably the amine from which the diazo component is made has the general formula

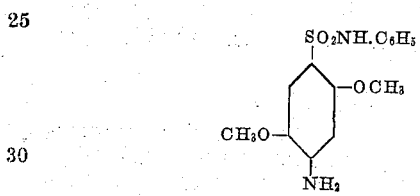

The new dyestuffs produce yellow tints having good properties of fastness. They are especially suitable for coloring plastic masses composed of organic compounds of high molecular weight, for example, urea-formaldehyde, phenol-formaldehyde or amine-formaldehyde condensation products, polyvinyl compounds, rubber and the like, and they can also be used for producing coloring lacquers fast to oil and light, and can be used with advantage, by adding them to spinning solutions, for producing spun-dyed artificial silk of cellulose acetate or of viscose.

The dyestuffs of the present invention are distinctly superior with regard to their tendency to bleed into undyed polymerization products from vinyl chloride, to the known dyestuffs described in German specifications Nos. 637,019 and 637,089 for the manufacture of which the same azo components are used.

The following examples illustrate the invention, the parts being by weight unless otherwise stated:

Example 1

15.4 parts of 1-amino-2:5-dimethoxybenzene-4-sulphonic acid phenyl amide are diazotized in the usual manner. In order to eliminate the excess of mineral acid the diazo solution is mixed with sodium acetate, and it is then stirred into an aqueous suspension of 13.6 parts of 1-acetoacetyl-amino-2:5 - dimethoxy - 4 - chlorobenzene, which has been obtained by dissolving the latter compound in dilute caustic soda solution and precipitating it with acetic acid. When the coupling has ceased, the resulting dyestuff is separated by filtration, washed well and dried. It is a yellow powder and has the structural formula

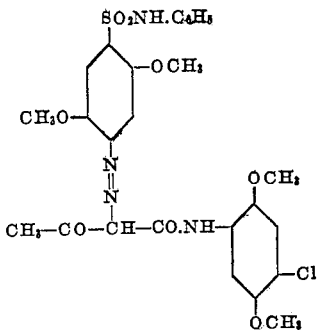

The resulting dyestuff may be used for coloring a polymerization product of vinyl chloride in the following manner:

100 parts of a polymerization product of vinyl chloride, 50 parts of phthalic acid n-dibutyl ester, as a softening agent, 0.3 part of titanium dioxide and 0.45 part of the above azo dyestuff are mixed together, and the mixture is then rendered homogeneous by treatment on kneading rollers for 10 minutes at 140° C. There is obtained a soft rubber-like mass having a yellow color, which does not bleed into the undyed polymerization product and has a good fastness to light.

Instead of, or in addition to, titanium dioxide there may be incorporated in the kneadable mass other filling materials customarily used in working up rubber.

Example 2

15.4 parts of 1-amino-2:5-dimethoxybenzene-4-sulphonic acid phenyl amide are diazotized in the usual manner. The diazo solution is rendered neutral to Congo with sodium acetate, and then stirred into a suspension of 12.8 parts of 1 - acetoacetylamino - 2 - methoxy - 4 - chloro-5-methylbenzene, prepared by dissolution of the latter compound in caustic soda solution and precipitation with acetic acid. The resulting yellow dyestuff is separated by filtration, washed well and dried. It possesses the structural formula

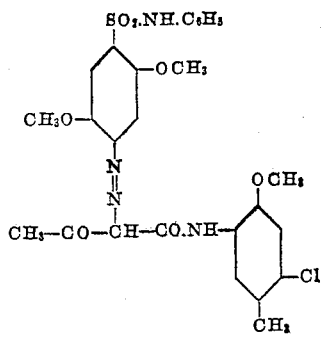

It can be used for coloring rubber in the following manner: 2 per cent of the resulting azo dyestuff are worked on rollers into a mixture of rubber, filling material, sulphur and a vulcanization accelerator. The mass is vulcanized in a hot press, and then has a yellow color, which has a good fastness to light and neither effloresces nor bleeds when in contact with white rubber.

By immersing a mixture of rubber, the usual additions and 0.5 per cent. of the azo dyestuff in a solution of sulphur monochloride in benzene and vulcanizing in the cold, there is obtained a mass of which the coloring has similar properties.

Example 3

A yellow dyestuff is prepared in the manner described in the preceding examples from the diazo compound of 16.1 parts of 1-amino-2:5-dimethoxybenzene-4-sulphonic acid - (2'-methyl)-phenyl amide and 12.8 parts of 1-acetoacetyl-amino-2-methoxy-4-chloro - 5 - methylbenzene. Lacquers prepared with the resulting dyestuff produce yellow tints of good fastness to light and oil.

Alternatively, the coupling may be carried out in the presence of a vehicle suitable for the manufacture of colored lacquers.

white and 1 part of the azo dyestuff are mixed together.

The mixture is hardened by treatment with formaldehyde, whereby a horn-like mass is obtained, which has a yellow coloration of good fastness to light.

Example 4

The dyestuff from 15.5 parts of 1-amino-2:5-dimethoxybenzene-4-sulphonic acid phenyl amide and 16.8 parts of 1-acetoacetylamino-2:5-diethoxy-4-chlorobenzene prepared in the manner described in Example 1, which is a yellow In order to produce colored casein artificial horn the above pigment dyestuff may be used as follows:

200 parts of rennet casein, 8 parts of zinc powder, is used for coloring in the manner illustrated in that example a polymerization product of vinyl chloride. The yellow color of the resulting product is fast to light, and does not bleed out into the undyed polymerization product.

Example 5

By using in Example 1, instead of 13.6 parts of 1-acetoacetylamino-2:5-dimethoxy-4-chlorobenzene, 15.8 parts of 1-acetoacetylamino-2:5-dimethoxy-4-bromobenzene there is obtained a dyestuff having a similar tint. 0.5 part of this dyestuff is added to 100 parts of a condensation product of urea and formaldehyde, which contains 30 per cent. of wood meal as a filling material, and the whole is ground in a ball mill for 12 hours. The mass is then placed in a press and pressing and hardening to form the desired moulded structure are carried out in 5 minutes at 140° C. under pressure.

In the following table are mentioned further components which can be used in the present process and the tints of the monoazo dyestuffs so obtainable. All these dyestuffs likewise possess good properties of fastness.

| Diazo-component | Azo-component | Tint |
|---|---|---|
| 1-Amino-2:5-dimethoxy-benzene-4-sulphonic acid phenylamide. | 1-Acetoacetylamino-2:5-diethoxy-4-bromo-benzene. | Yellow. |
| Do. | 1-acetoacetylamino-2-methyl-4-chloro-5-methoxybenzene. | Do. |
| 1-amino-2:5-dimethoxy-benzene-4-sulphonic acid-(2'-methyl)-phenylamide. | 1-acetoacetylamino-2:5-dimethoxy-4-chlorobenzene. | Do. |
| 1-amino-2:5-dimethox)-benzene-4-sulphonic acid-(2':4'-dimethyl)-phenylamide. | do | Do. |
| 1-amino-2:5-dimethoxy-benzene-4-sulphonic acid-phenylamide. | 1-acetoacetylamino-2:4-dimethoxy-5-chlorobenzene. | Do. |
| Do. | 1-acetoacetylamino-2-methoxy-4-bromo-5-methylbenzene. | Do. |
| 1-amino-2:5-dimethoxy-benzene-4-sulphonic acid-(3'-chloro-)-phenylamide. | 1-acetoacetylamino-2:5-dimethoxy-4-chlorobenzene. | Do. |
| Do. | 1-acetoacetylamino-2-methoxy-4-chloro-5-methylbenzene. | Do. |
| 1-amino-2:5-dimethoxy-benzene-4-sulphonic acid-(4'-bromo)-phenylamide. | do | Do. |
| 1-amino-2:5-dimethoxy-benzene-4-sulphonic acid-(4'-chloro)-phenylamide. | 1-acetoacetylamino-2:5-dimethoxy-4-chlorobenzene. | Do. |
| 1-amino-2:5-dimethoxy-benzene-4-sulphonic acid-(2':5'-dimethoxy-4'-chloro)-phenylamide. | do | Do. |
| 1-amino-2:5-dimethoxy-benzene-4-sulphonic acid-(2'-methyl-4'-chloro)-phenylamide. | do | Do. |

The second dyestuff listed in the foregoing table has the structural formula

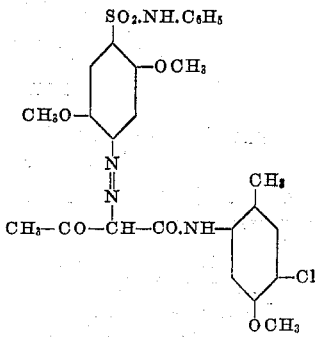

and the fifth dyestuff listed has the structural formula

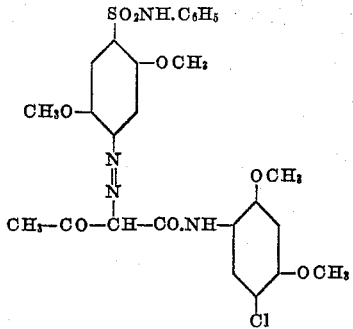

I claim:

1. The monoazodyestuffs of the following general formula

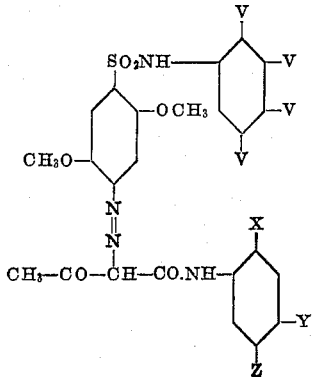

wherein each V stands for a substituent of the group consisting of hydrogen, lower alkyl, lower alkoxy and halogen, and X stands for a substituent of the group consisting of lower alkyl and lower alkoxy, and Y stands for a substituent of the group consisting of lower alkoxy and halogen, and Z stands for a substituent of the group consisting of lower alkyl, lower alkoxy and halogen, at least one of the substituents X, Y and Z standing for lower alkoxy and one of the substituents Y and Z standing for halogen, said dyestuffs being water insoluble yellow powders.

2. The monoazo-dyestuffs of the following general formula

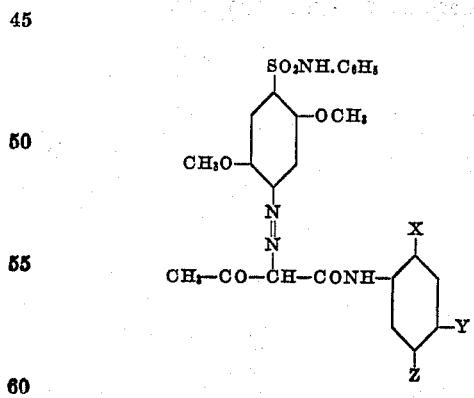

wherein X stands for a substituent of the group consisting of lower alkyl and lower alkoxy, and Y stands for a substituent of the group consisting of lower alkoxy and halogen, and Z stands for a substituent of the group consisting of lower alkyl, lower alkoxy and halogen, at least one of the substituents X, Y and Z standing for lower alkoxy and one of the substituents Y and Z standing for halogen, said dyestuffs being water insoluble yellow powders.

3. The monoazo dyestuff of the following formula:

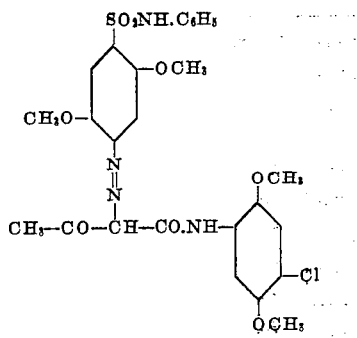

being a water-insoluble yellow powder.

4. The monoazo dyestuff of the following formula:

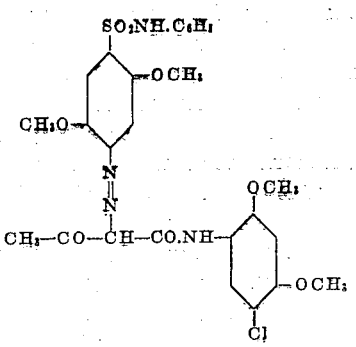

being a water-insoluble yellow powder.

5. The monoazo dyestuff of the following formula:

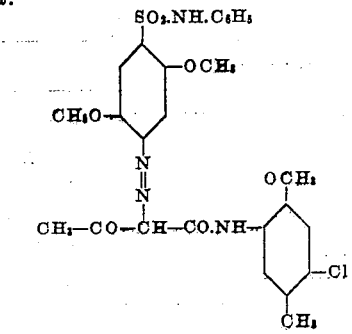

being a water-insoluble yellow powder.

6. The monoazo dyestuff of the following formula:

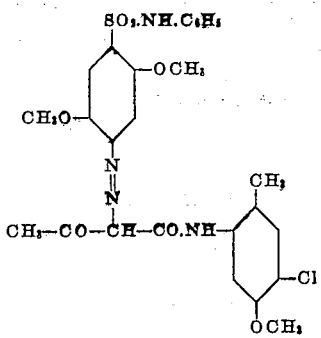

being a water-insoluble yellow powder.

ERNST FISCHER.

References Cited in the file of this patent

UNITED STATES PATENTS

| Number | Name | Date |
|---|---|---|
| 2,142,594 | Zitscher et al. | Jan. 3, 1939 |
| 2,427,537 | Straub et al. | Sept. 16, 1947 |

FOREIGN PATENTS

| Number | Country | Date |
|---|---|---|
| 479,848 | Great Britain | Feb. 10, 1938 |